(12) United States Patent
Watts et al.

(10) Patent No.: US 11,960,117 B2
(45) Date of Patent: Apr. 16, 2024

(54) OPTICAL PHASED ARRAY LIGHT SHAPING

(71) Applicant: Analog Photonics LLC, Boston, MA (US)

(72) Inventors: Michael Robert Watts, Hingham, MA (US); Katia Shtyrkova, Lexington, MA (US)

(73) Assignee: Analog Photonics LLC, Boston, MA (US)

( * ) Notice: Subject to any disclaimer, the term of this patent is extended or adjusted under 35 U.S.C. 154(b) by 0 days.

(21) Appl. No.: 17/740,530

(22) Filed: May 10, 2022

(65) Prior Publication Data

US 2023/0117688 A1 Apr. 20, 2023

Related U.S. Application Data

(60) Provisional application No. 63/256,858, filed on Oct. 18, 2021.

(51) Int. Cl.

| | | |
|---|---|---|
| G02B 6/12 | (2006.01) | |
| G01S 7/481 | (2006.01) | |
| G02B 6/124 | (2006.01) | |
| G01S 17/32 | (2020.01) | |
| G02B 6/44 | (2006.01) | |

(52) U.S. Cl.
CPC ............ G02B 6/124 (2013.01); G01S 7/4818 (2013.01); G02B 6/12004 (2013.01); *G01S 17/32* (2013.01); *G02B 6/12009* (2013.01); *G02B 2006/12102* (2013.01);

(Continued)

(58) Field of Classification Search
CPC .......................... G02B 6/4432; G02B 6/12009
See application file for complete search history.

(56) References Cited

U.S. PATENT DOCUMENTS

| | | | | | |
|---|---|---|---|---|---|
| 4,203,105 | A | * | 5/1980 | Dragone | .............. H01Q 19/192 |
| | | | | | 343/837 |
| 4,618,867 | A | * | 10/1986 | Gans | ...................... H01Q 19/19 |
| | | | | | 343/781 P |

(Continued)

FOREIGN PATENT DOCUMENTS

| | | | |
|---|---|---|---|
| CN | 107611779 A | * | 1/2018 |
| CN | 109343034 A | | 2/2019 |

(Continued)

OTHER PUBLICATIONS

CN 107611779 A English translation (Year: 2018).*

(Continued)

*Primary Examiner* — Charlie Y Peng
(74) *Attorney, Agent, or Firm* — Young Basile Hanlon & MacFarlane, P.C.

(57) ABSTRACT

An apparatus comprises: a photonic integrated circuit comprising an optical phased array, a first focusing element at a fixed position relative to the optical phased array and configured to couple an optical beam to or from the optical phased array, and a second focusing element at a fixed position relative to the first focusing element and configured to couple the optical beam to or from the first focusing element. At least one of the first or second focusing element is externally coupled to the photonic integrated circuit, and the first and second focusing elements have different effective focal lengths.

24 Claims, 13 Drawing Sheets

(52) U.S. Cl.
CPC .............. *G02B 2006/12104* (2013.01); *G02B 2006/12107* (2013.01); *G02B 6/4432* (2013.01)

(56) References Cited

U.S. PATENT DOCUMENTS

| | | | | |
|---|---|---|---|---|
| 4,705,400 | A | * 11/1987 | Ellerbroek | G01J 9/00 356/521 |
| 6,721,057 | B1 | * 4/2004 | Reininger | G01J 3/4531 356/450 |
| 6,924,923 | B2 | 8/2005 | Serati et al. | |
| 10,466,038 | B1 | * 11/2019 | Kokubun | G02B 17/00 |
| 10,545,289 | B1 | 1/2020 | Chriqui et al. | |
| 2003/0231308 | A1 | 12/2003 | Granger | |
| 2005/0162762 | A1 | * 7/2005 | Novak | G03F 7/70266 359/849 |
| 2006/0267851 | A1 | * 11/2006 | Turner | H01Q 19/192 343/781 R |
| 2009/0114629 | A1 | 5/2009 | Gross et al. | |
| 2012/0120410 | A1 | * 5/2012 | Sitter, Jr. | G01B 9/02057 356/520 |
| 2017/0003507 | A1 | 1/2017 | Raval et al. | |
| 2017/0315420 | A1 | 11/2017 | Watts et al. | |
| 2018/0011173 | A1 | 1/2018 | Newman | |
| 2018/0231643 | A1 | 8/2018 | Lee et al. | |
| 2018/0267250 | A1 | 9/2018 | Hosseini et al. | |
| 2019/0056634 | A1 | 2/2019 | Hosseini et al. | |
| 2019/0243081 | A1 | 8/2019 | Watts et al. | |
| 2019/0391243 | A1 | 12/2019 | Nicolaescu | |
| 2020/0333683 | A1 | 10/2020 | Skirlo et al. | |
| 2022/0146903 | A1 | 5/2022 | Watts et al. | |

FOREIGN PATENT DOCUMENTS

| | | | |
|---|---|---|---|
| EP | 2778711 A1 | 9/2014 | |
| WO | 0070302 A1 | 11/2000 | |
| WO | WO-2014140528 A1 | * 9/2014 | .............. G02B 6/32 |
| WO | 2018124285 A1 | 7/2018 | |
| WO | 2020171946 A1 | 8/2020 | |
| WO | 2021153828 A1 | 8/2021 | |

OTHER PUBLICATIONS

Kim et al., "Compact Solid-State Optical Phased Array Beam Structures Based on Polymeric Photonic Integrated Circuits", Nature Portfolio, Scientific Reports, May 19, 2021, https://doi.org/10.1038/s41598-021-90120-x.

Kossey et al., "End-fire silicon optical phased array with half-wavelength spacing", APL Photonics 3, 011301, Dec. 20, 2017, https://doi.org/10.1063/1.5000741.

Yoon et al., "Collimation of diverged beam using a cylindrical lens in a silicon-based end-fire optical phased array", Electronics Letters, vol. 56, No. 7, Mar. 30, 2020, pp. 337-339.

Office Action issued in corresponding U.S. Appl. No. 17/501,419, dated Oct. 13, 2023.

Liang Wu et al., "Arbitrary multiple beam forming by two cascaded liquid crystal optical phased arrays," Optics Express, vol. 26, No. 13, pp. 17066-17077, Jun. 25, 2018, https://doi.org/10.1364/OE.26.017066.

Zhi Li et al., "Virtually imaged phased-array-based 2D nonmechanical beam-steering device for FMCW LiDAR," Appl. Opt., vol. 60, No. 8, pp. 2177-2189, Mar. 10, 2021, https://doi.org/10.1364/AO.414128.

Office Action issued in corresponding U.S. Appl. No. 17/501,419, dated Feb. 6, 2024.

* cited by examiner

OPTICAL PHASED ARRAY LIGHT SHAPING

CROSS-REFERENCE TO RELATED APPLICATION(S)

This application claims priority to and the benefit of U.S. Provisional Application No. 63/256,858, entitled "Optical Phased Array Light Steering," filed Oct. 18, 2021, incorporated herein by reference.

TECHNICAL FIELD

This disclosure relates to optical phased array light shaping.

BACKGROUND

Some optical phased arrays (OPAs) have a linear distribution of emitter elements (also called emitters or antennas). Steering about a first axis perpendicular to the linear distribution can be provided by changing the relative phase shifts in phase shifters feeding each of the emitter elements. Other techniques can be used for steering about a second axis orthogonal to the first axis. The size and divergence of the steered beam may be determined by characteristics of the OPA.

SUMMARY

In one aspect, in general, an apparatus includes: a photonic integrated circuit comprising an optical phased array, a first focusing element at a fixed position relative to the optical phased array and configured to couple an optical beam to or from the optical phased array, and a second focusing element at a fixed position relative to the first focusing element and configured to couple the optical beam to or from the first focusing element. At least one of the first or second focusing element is externally coupled to the photonic integrated circuit, and the first and second focusing elements have different effective focal lengths.

In another aspect, in general, a method for optically coupling to an optical phased array in a photonic integrated circuit includes: coupling an optical beam to or from the optical phased array, coupling the optical beam between the optical phased array and a first focusing element at a fixed position relative to the optical phased array, and coupling the optical beam between the first focusing element and a second focusing element at a fixed position relative to the first focusing element. At least one of the first or second focusing element is externally coupled to the photonic integrated circuit, and the first and second focusing elements have different effective focal lengths.

Aspects can include one or more of the following features.

The first focusing element comprises a refractive element.

The refractive element comprises one or more lenses.

The first focusing element comprises a reflective surface.

The second focusing element comprises a reflective surface.

Each of the first and second focusing elements comprises a parabolic mirror configured to reflect an optical beam off-axis from an axis of the parabolic mirror.

The first focusing element has a positive focal length in at least a first dimension and the second focusing element has a negative focal length in at least the first dimension.

The second focusing element comprises a refractive element.

The fixed position of the second focusing element relative to the first focusing element is configured to provide an afocal beam expansion configuration.

The photonic integrated circuit and the first and second focusing elements are included in at least a portion of a LiDAR system.

The photonic integrated circuit and the first and second focusing elements are included in at least a portion of a free space optical link of a communication system.

Aspects can have one or more of the following advantages.

The techniques described herein can be used for providing a variety of mechanisms for shaping the size and divergence of a light beam received by and/or transmitted from an OPA-based device. The OPA can be used for transmitting and/or receiving an optical beam at a desired angle of transmission and/or reception. In some implementations of an OPA, one or more photonic integrated circuits (or chips) include a linear arrangement of OPA antennas that emit light that coherently interferes to provide a beam that is steered about a first axis using OPA phase shifts. The OPA-based transceiver can be configured in a compact and efficient manner to include any of a variety of other steering mechanisms for steering about a second axis that is perpendicular to the first axis. Alternatively, in some implementations a two-dimensional (2D) arrangement of OPA antennas can emit light that is steered based on phase OPA phase shifts. In general, beam expansion can be provided to expand the size of the beam while preserving a limited beam divergence by a variety of techniques, as described in more detail below. The beam expansion allows the use of smaller or more compact OPAs that still achieve a large effective aperture size, as well as the ability to increase the beam size beyond the full reticle. The use of a smaller or more compact OPA generally enables the OPA to be fabricated with more uniform emitters since deviations from uniformity have the potential to grow worse with a larger device size. These techniques can be used, for example, for OPA-based LiDAR sensor systems, and for telecommunication terminals, such as nodes of a communication system that uses free space optical links between nodes. For such optical systems, the waves forming the beams have a spectrum that has a peak wavelength that falls in a particular range of optical wavelengths (e.g., between about 100 nm to about 1 mm, or some subrange thereof), also referred to as optical waves, light waves, or simply light.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

An optical beam emitted from an optical phased array within an OPA-based transceiver can be steered using reflective, dispersive, and/or refractive structures, for example. The same "steering" mechanisms can be used to configure the angle of reception for an incoming optical beam being received into the optical phased array. Some implementations utilize an external beam expansion device for changing the size of a beam, as described in more detail below. The emission angle of the outgoing beam, and (the same) receiving angle of the incoming beam, can be steered in one plane with phase control (i.e., controlling the relative phase shifts applied by phase shifters coupled to respective antennas). In some examples, the steering in another (e.g., orthogonal) plane is performed by a steering element that is implemented using a dispersive element such as a diffractive element (e.g., a diffractive surface element such as a diffraction grating) by changing the incident wavelength via laser tuning. Alternatively, the steering element can use an alternative steering mechanism such as liquid crystal, metasurface, polarization gratings, acousto-optic, a refractive element (e.g., a prism), and/or another kind of dispersive element.

Figure 8:
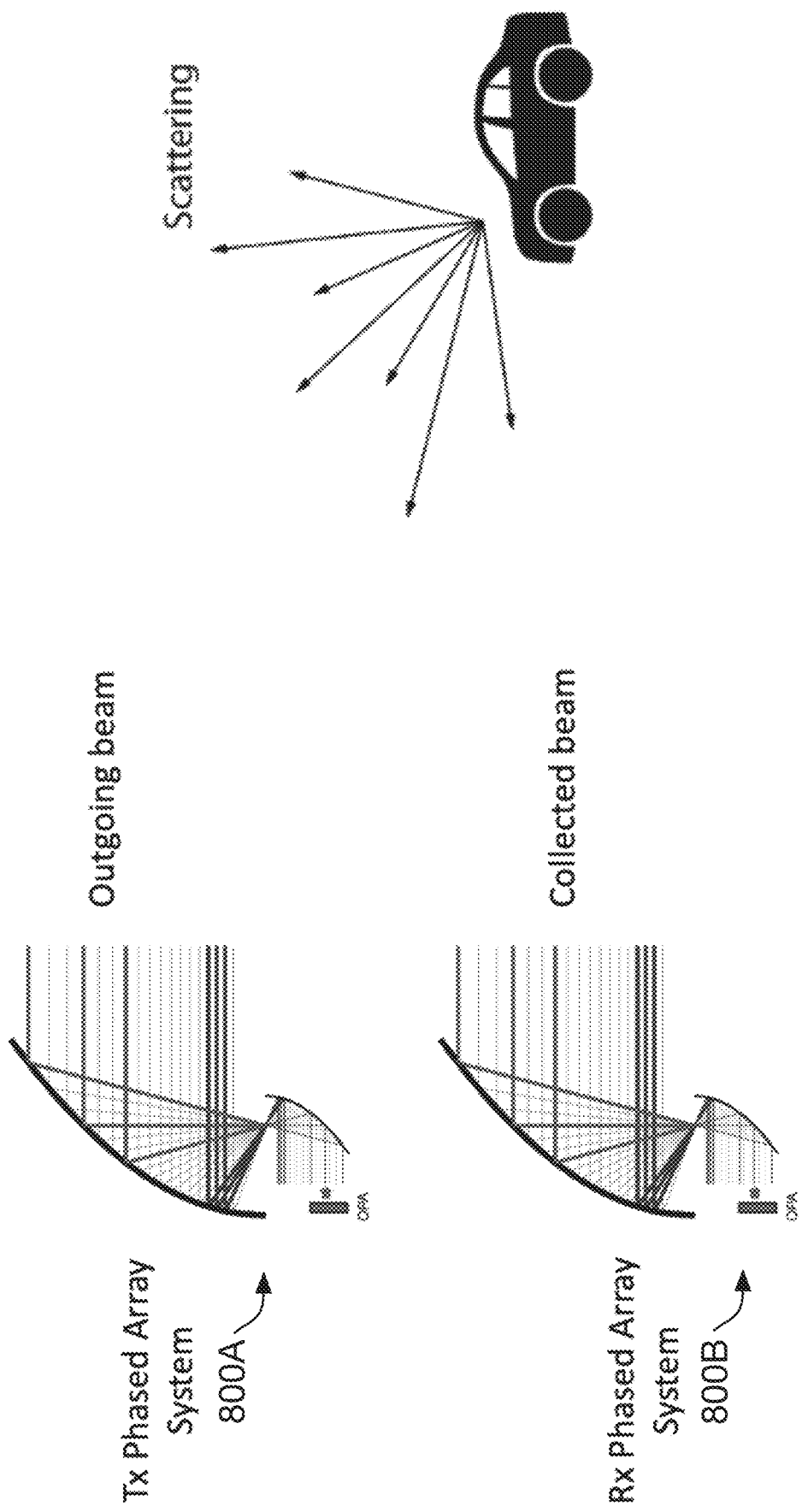
FIG. 8 is a schematic diagram of an example LiDAR system.

The transceiver may be used in any of a variety of systems that call for a beam to have a relatively large size and a relatively collimated (i.e., slowly diverging) beam focusing characteristic. If the OPA-based transceiver is used in a LiDAR sensor system, a transmit (Tx) OPA may provide an outgoing beam that is scattered from an object, and the backscattered light may travel the same path in reverse to be collected by the same OPA, or may be collected by a neighboring receive (Rx) OPA (as described in more detail below for FIG. 8), or a neighboring transceiver. If the OPA-based transceiver is used in a free space optical communication system, a Tx (Rx) OPA of a local terminal may be in communication with an Rx (Tx) OPA of a distant terminal (as described in more detail below for FIG. 9).

Figure 1:
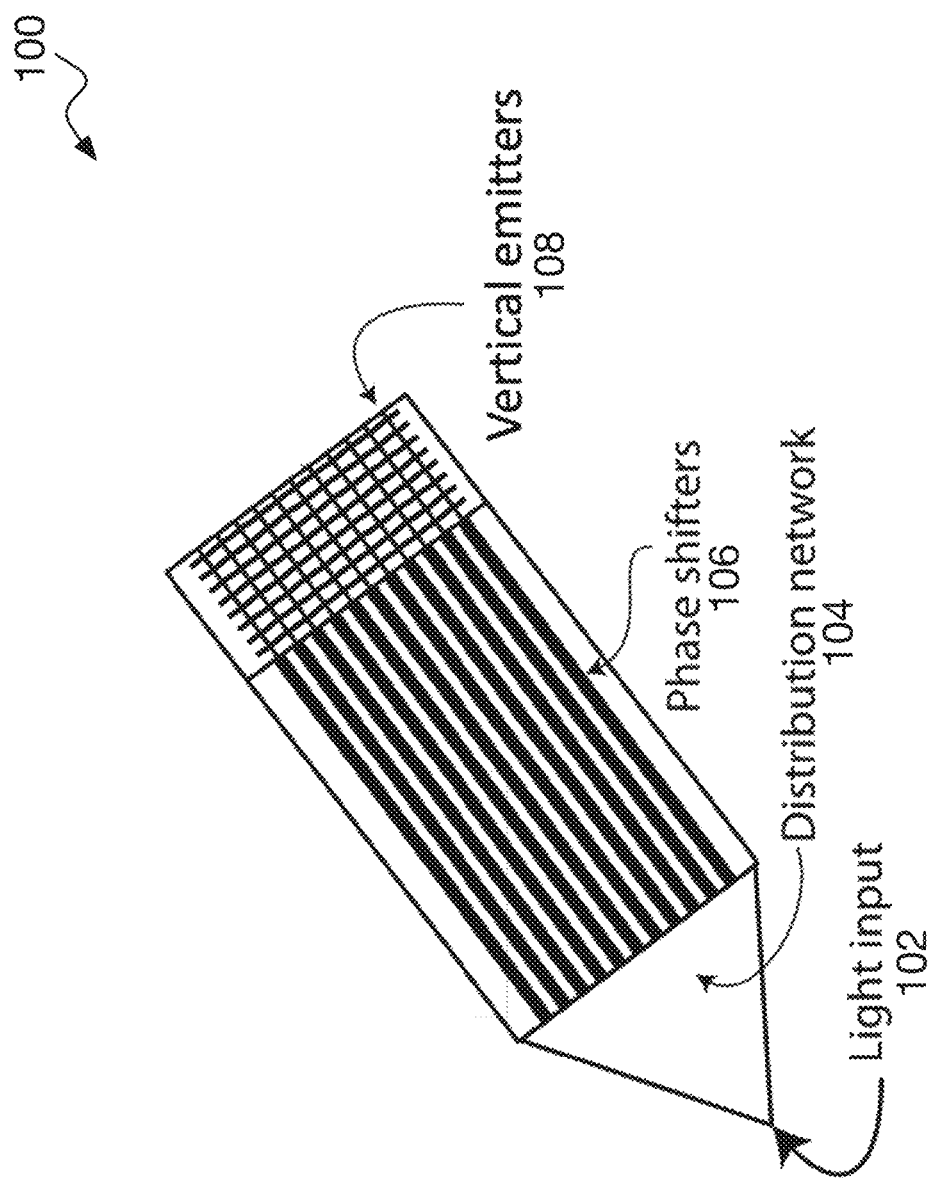
FIG. 1 is a schematic diagram of an example vertically emitting OPA chip.

FIG. 1 shows an example of an OPA chip 100 that emits a beam from light that is received at a light input 102. A distribution network 104 (such as a waveguide tree or star coupler) distributes the light to respective waveguide-based phase shifters 106 that are configured to impose programmable phase shifts by controlling the index of refraction based on an input signal (such as electrooptic, thermal, liquid crystal, pn junction based, etc.). The phase-shifted light is then emitted from vertical emitters 108 such as grating couplers, waveguide grating antennas, or other extended emitters that gradually emit light in a substantially vertical direction (e.g., around 90-degrees from the direction of propagation). The emitted light interferes to form a beam that is emitted from an emission surface over the collection of vertical emitters 108. In such implementations, where the surface emission is achieved by relatively long gratings, the direction of emission is highly wavelength dependent, which can be useful (e.g., in case of intentional steering with wavelength sweeps). Another advantage of such surface emission is a relatively slow beam divergence such that the beam is substantially collimated.

Figure 2A:
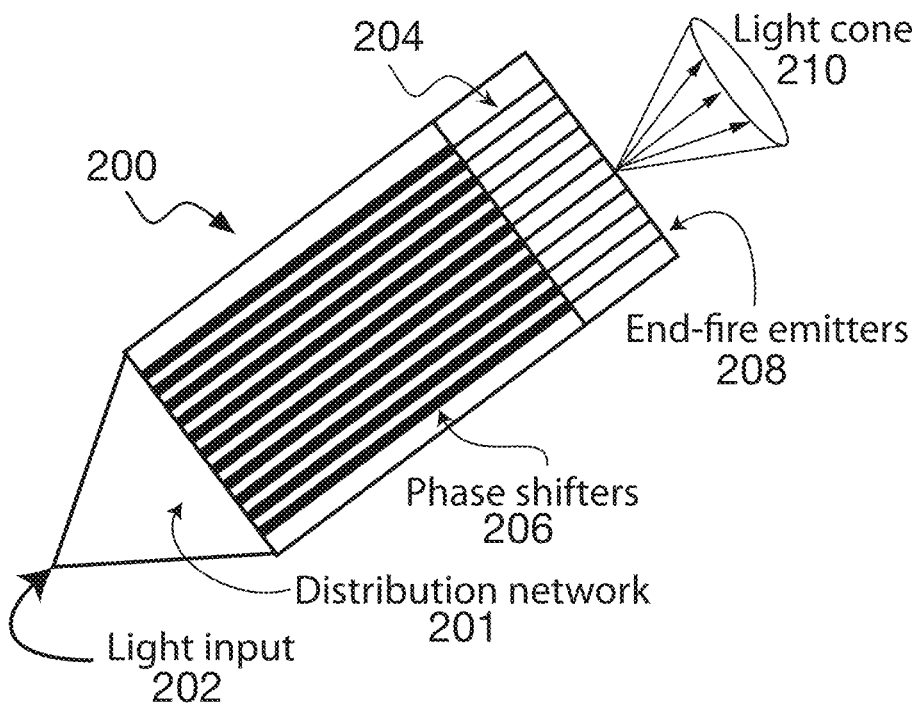
FIGS. 2A and 2B are schematic diagrams of an example end-fire emitting OPA chip.

Alternatively, other types of emitters can be used with mechanisms to limit the beam divergence. Referring to FIG. 2A, an OPA chip 200 includes a distribution network 201 (such as a waveguide tree or star coupler) deliver equal (or predetermined, such as Gaussian) distribution of optical field from a light input 202 to an array of waveguides 204. Individual phase shifters 206 (such as electrooptic, thermal, liquid crystal, pn junction based, etc.) can be coupled to respective waveguides 204 to control the phase of the light that is emitted from the end-fire emitters 208 at the ends of the array of waveguides 204.

Figure 2B:
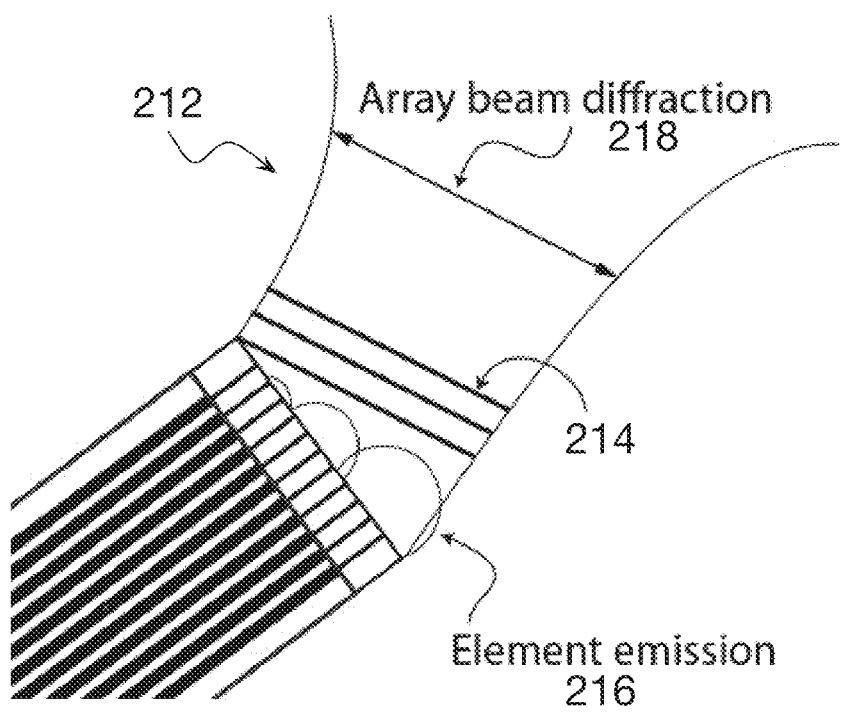

The light can be coupled into the light input 202 on the OPA chip 200 from a laser that is on or off the OPA chip 200. The light from each of emitters 208 passes through phase shifters 206 and emitters 208 and is emitted into a cone of light 210. Each emitter 208 creates its own element factor in both sideways and up-down directions. If the phase shifters 206 impart a linear progression of phase (which can be wrapped within 0-2π) to the light coming out of the emitters 208, the light from all emitters combine in an emitted beam 212 that has substantially flat phase fronts 214 (e.g., plane wave emission) in the plane of the OPA chip 200, as shown in FIG. 2B. As can be seen in FIG. 2B, which shows the top view of the optical phased array portion of the OPA chip 200 during operation, the beam 212 emitted from the optical phased array diffracts with a pattern determined by the width of the optical phase array (and the angel of observation). So, even though the light 216 emitted from each emitter diverges quickly, the overall array beam diffraction 218 behaves like a slowly diverging semi-gaussian beam. Nevertheless, in the vertical direction the behavior of this planar array is not comparable to the in-plane view shown in FIG. 2B.

Figure 3A:
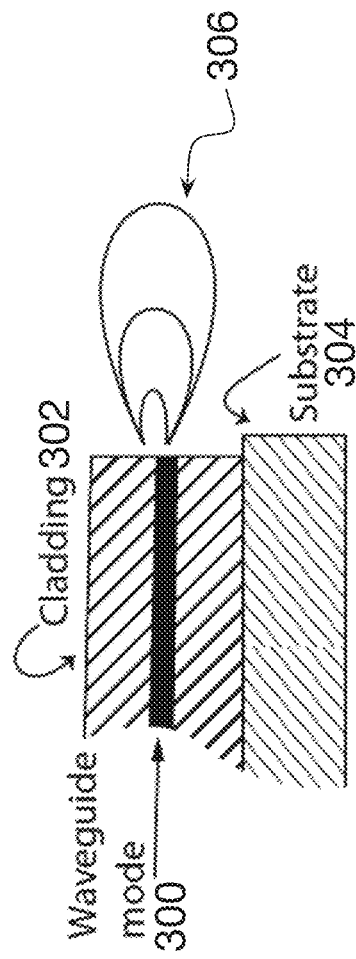
FIGS. 3A, 3B, and 3C are schematic diagrams of OPA beam divergence.
Figure 3B:
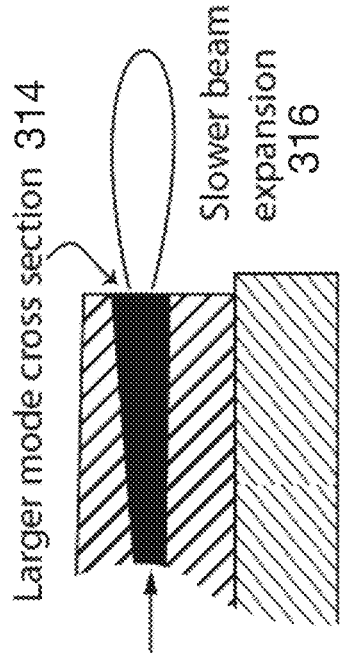
Figure 3C:
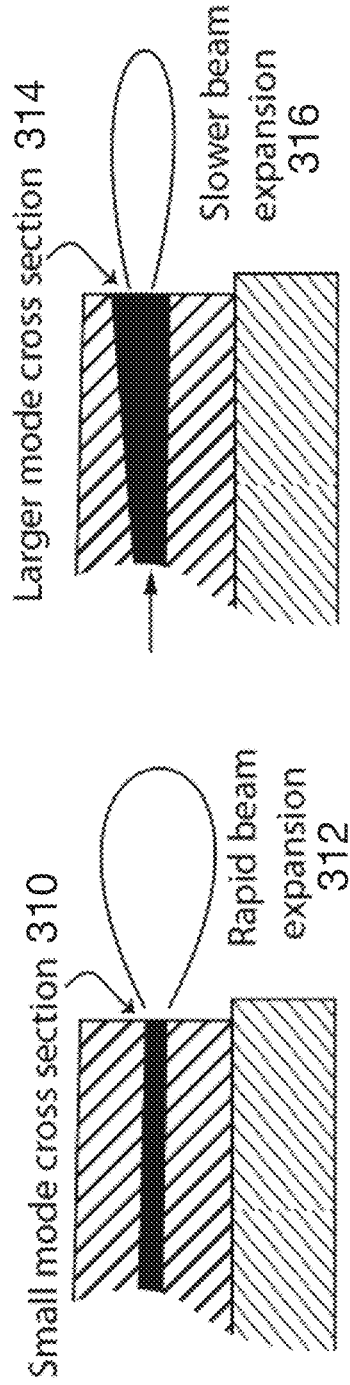

As can be seen in FIG. 3A, showing the cross section of the optical phased array viewed from the side, with a waveguide mode 300 corresponding to a core layer (e.g., silicon) within a cladding 302 (e.g., silicon dioxide) that is on top of a substrate 304 (e.g., a buried oxide (BOX) layer of a silicon-on-insulator (SOI) platform). The beam 306 emitted from the waveguide mode 300 undergoes divergence in the illustrated plane that is perpendicular to the linear array of emitters according to the divergence of a single emitter, and thus diverges quickly in that plane. The rate of divergence, also measured by the mode cone angle, depends on the mode size. The beam divergence in the vertical direction of the illustrated plane depends on the effective aperture size of the end-fire emitter. In FIG. 3B, there is a small mode cross section 310 that leads to a rapid beam divergence 312. In FIG. 3C, there is a larger mode cross section 314 that leads to a slower beam divergence 316.

Figure 4A:
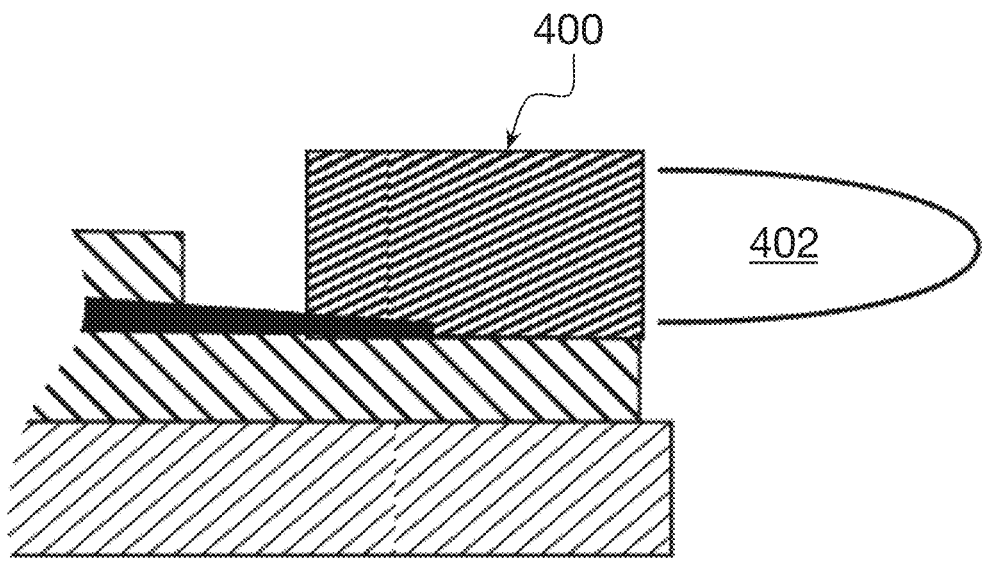
FIGS. 4A and 4B are schematic diagrams of structures for limiting beam divergence.
Figure 4B:
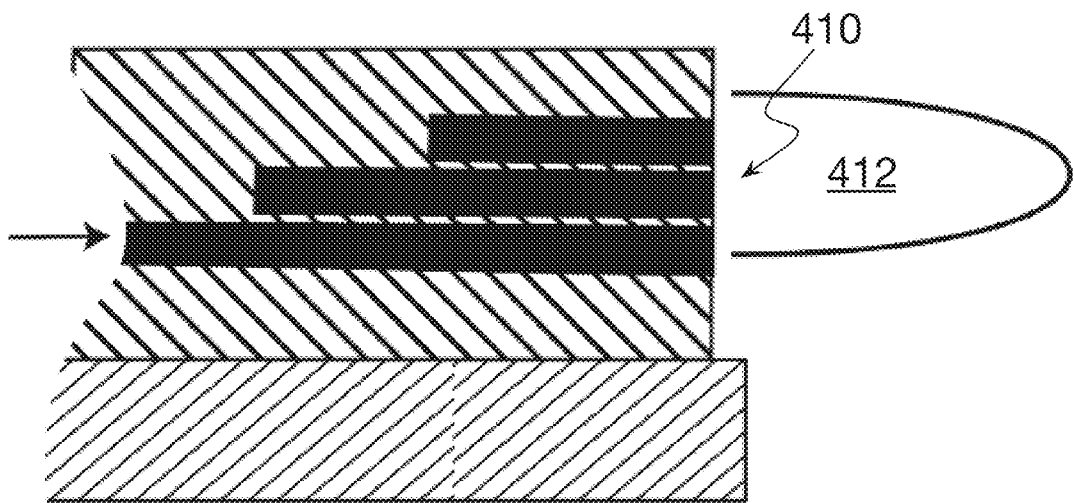
Figure 5:
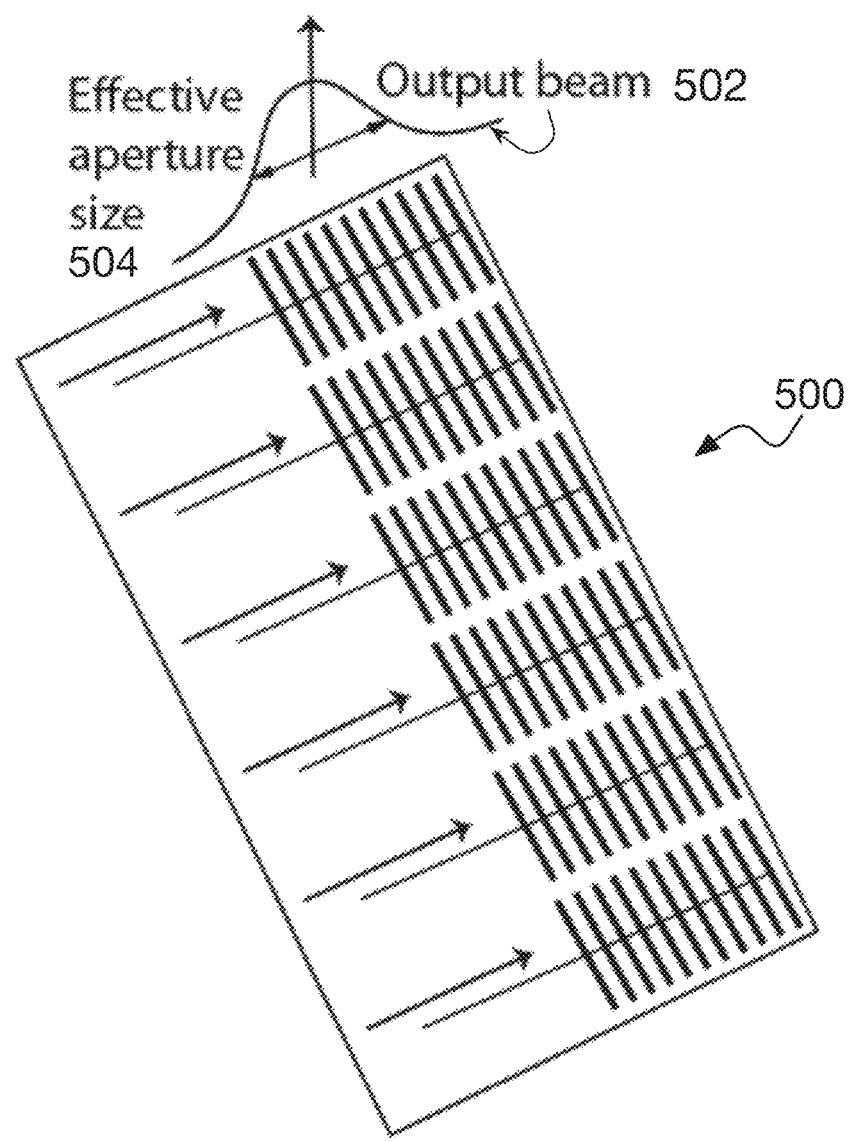
FIG. 5 is a schematic diagram of an array of grating emitters for limiting beam divergence.

The control of the mode and the associated beam divergence can be performed by any of a variety of techniques. For example, it is generally desirable to emit a relatively collimated beam, because after emission the light can be magnified to expand the transverse size of the beam without increasing divergence using two focusing elements (effectively a telescope) in order to create a larger effective aperture for either transmitting or receiving. This expansion by magnification will also change the diffraction angle with the inverse of the magnification ratio of the aperture size. Therefore, by first emitting a collimated beam, the output beam will remain collimated after the two focusing elements, as explained in more detail below. FIG. 4A shows an example of coupling light to a low index loosely guiding structure 400 (e.g., a layer of polymer, silicon oxynitride, silicon nitride, etc.) to limit divergence of a beam 402, and FIG. 4B shows an example of coupling to multiple guiding layers 410 gradually to limit divergence of a beam 412. Another way to reduce the beam divergence, through an increased beam size, is utilizing a grating emitter. FIG. 5 shows an example of an array 500 of grating emitters that are configured to emit an output beam 502 in a direction out of the plane of the grating emitters. The strength of this grating coupler can be adjusted in a way that the total length of the emitters and the corresponding effective aperture size 504 is suited to the desired beam divergence angle.

The techniques described above can increase the effective aperture size from submicrometric scale to several micrometers. Nevertheless, the transverse mode size of the beam may still increase faster in the vertical direction (perpendicular to the array) than in the sideways direction (in the plane of the array). One way to overcome the residual divergence of the beam is utilizing a focusing element with colimiting power only in the desired plane.

Referring to FIGS. 6A, 6B, 6C, 7A, and 7B, some implementations can include a beam expansion configuration for expanding a beam from an OPA, which may include one or more external optical elements. OPAs enable non-mechanical beam steering of optical beams out of integrated photonic chiplets. In some cases, the emitting aperture of an OPA is limited by the reticle size, which is a direct function of a fabrication process (usually, a function of the field size of a lithography stepper—for example, a common value is ~26×30 mm). A single OPA can only be as large as the full reticle. In some implementations, an external optical beam expander can be used to increase the beam size out of the OPAs by a designed beam expansion ratio. This allows the use of smaller/more compact OPAs that still achieve a large aperture size, as well as the ability to increase the beam size beyond the full reticle. In some implementations, the emitters are long grating antennas that are configured to emit light over the length of the grating antenna, for example, with the emitted light propagating along the Z dimension as the light in the OPA grating antennas propagates along the X dimension (into the page in the illustrated examples) (e.g., instead of end-fire emitters that emit from an end facet of a waveguide). In such examples, the beam may be relatively well collimated in both transverse dimensions, as opposed to some end-fire emitters, unless the end-fire emitters are configured to have slower divergence as in some of the examples described herein. For a particular example of an OPA where emitters are comprised of grating antennas, and a 2D beam steering that is accomplished by a phase shift in one dimension and wavelength-based steering in the second dimension, the beam expander described here allows the use of smaller grating emitters and allows an increase in the beam size external to the OPA. This allows much shorter grating emitters to be fabricated, which ultimately produce a more uniform beam. Examples of advantages that can result from using such a beam expander include:

- PIC/optical component alignment sensitivity is reduced significantly compared to other beam expansion methods for OPAs
- Larger beam size is possible without having to make larger antennas/die and without aperture stitching.
- Shorter antennas with post-PIC beam expansion allow for a more uniform beam quality.

Figure 6A:
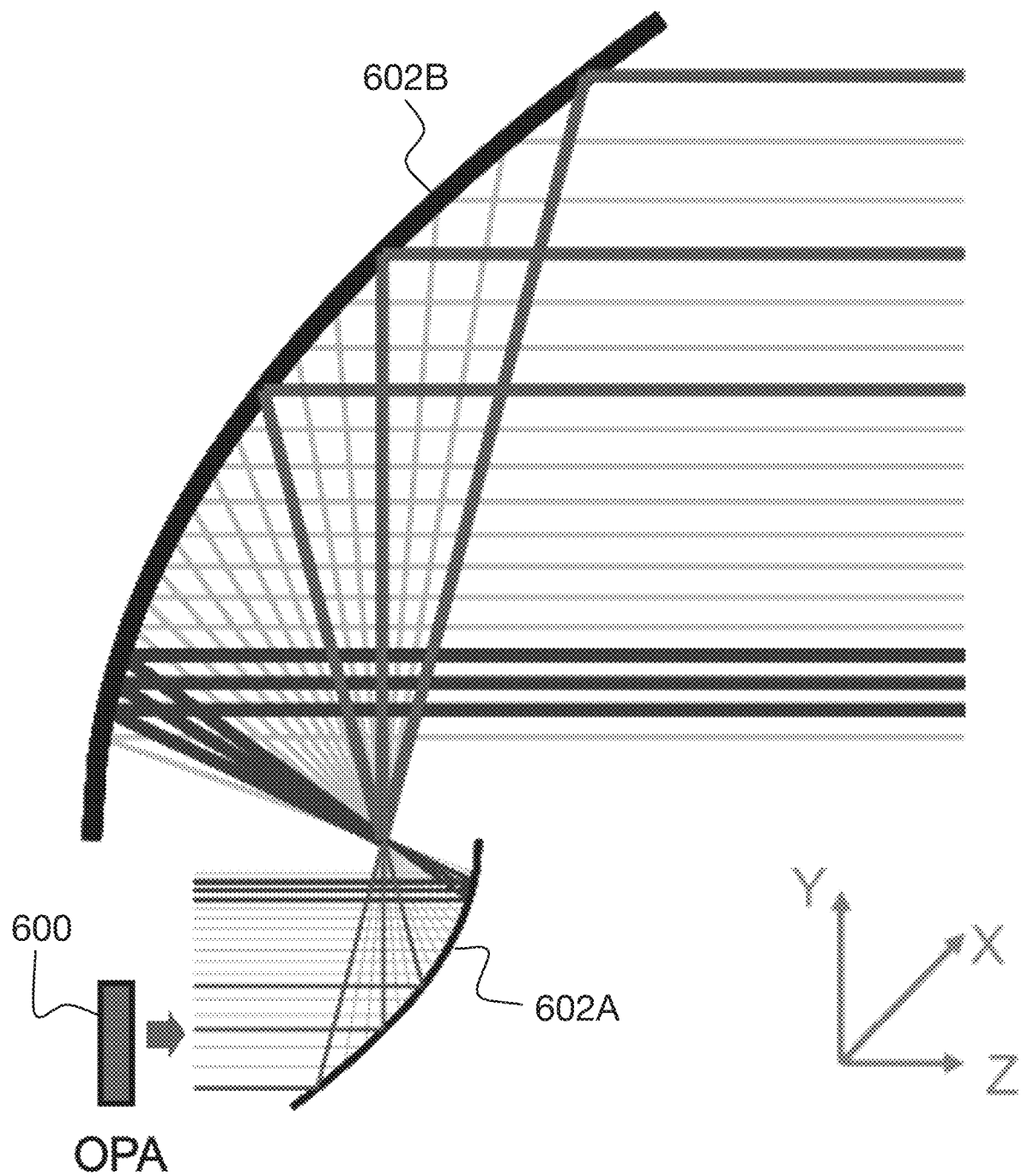
FIGS. 6A, 6B, and 6C are schematic diagrams of example beam expansion configurations.
Figure 6B:
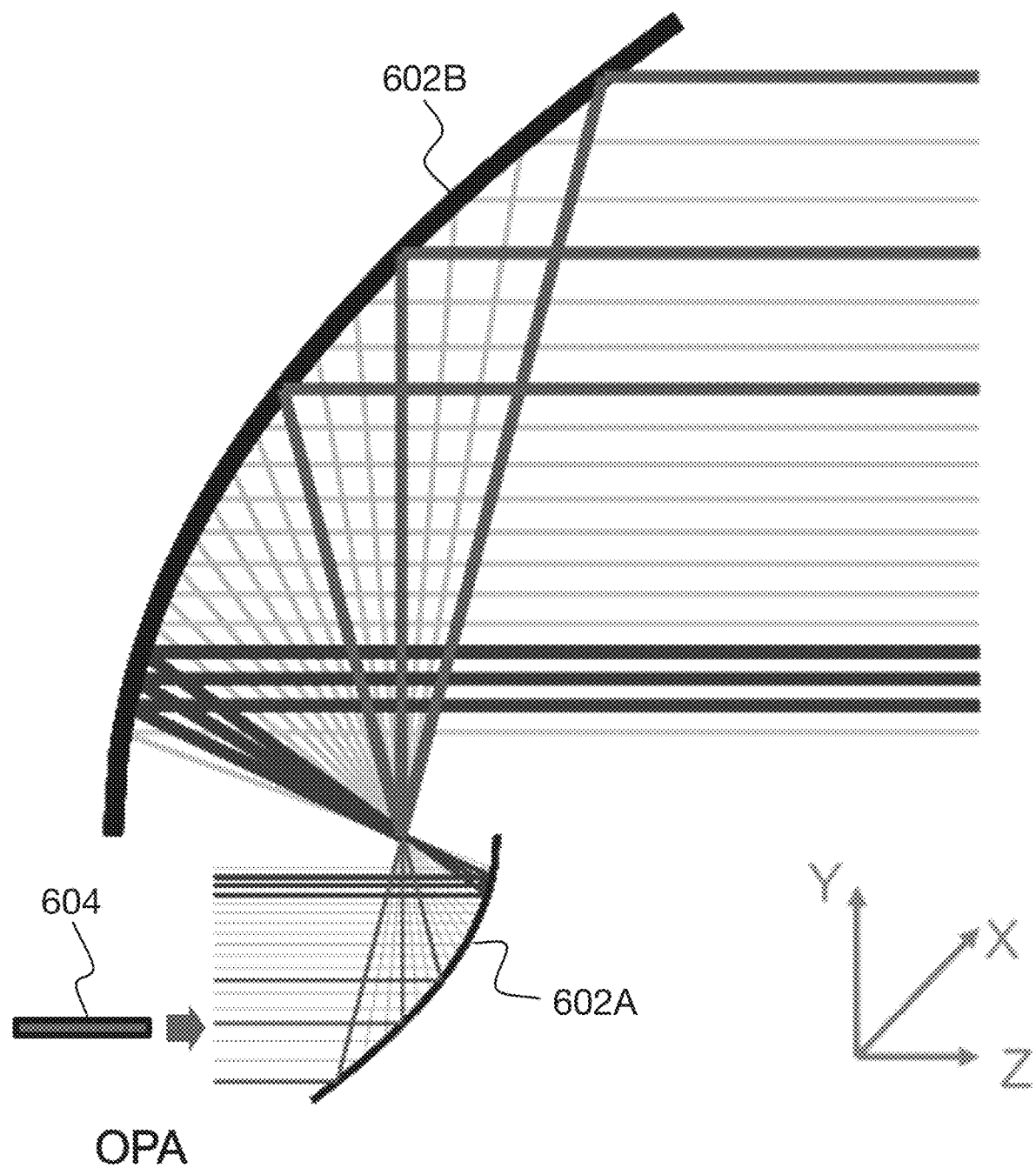
Figure 6C:
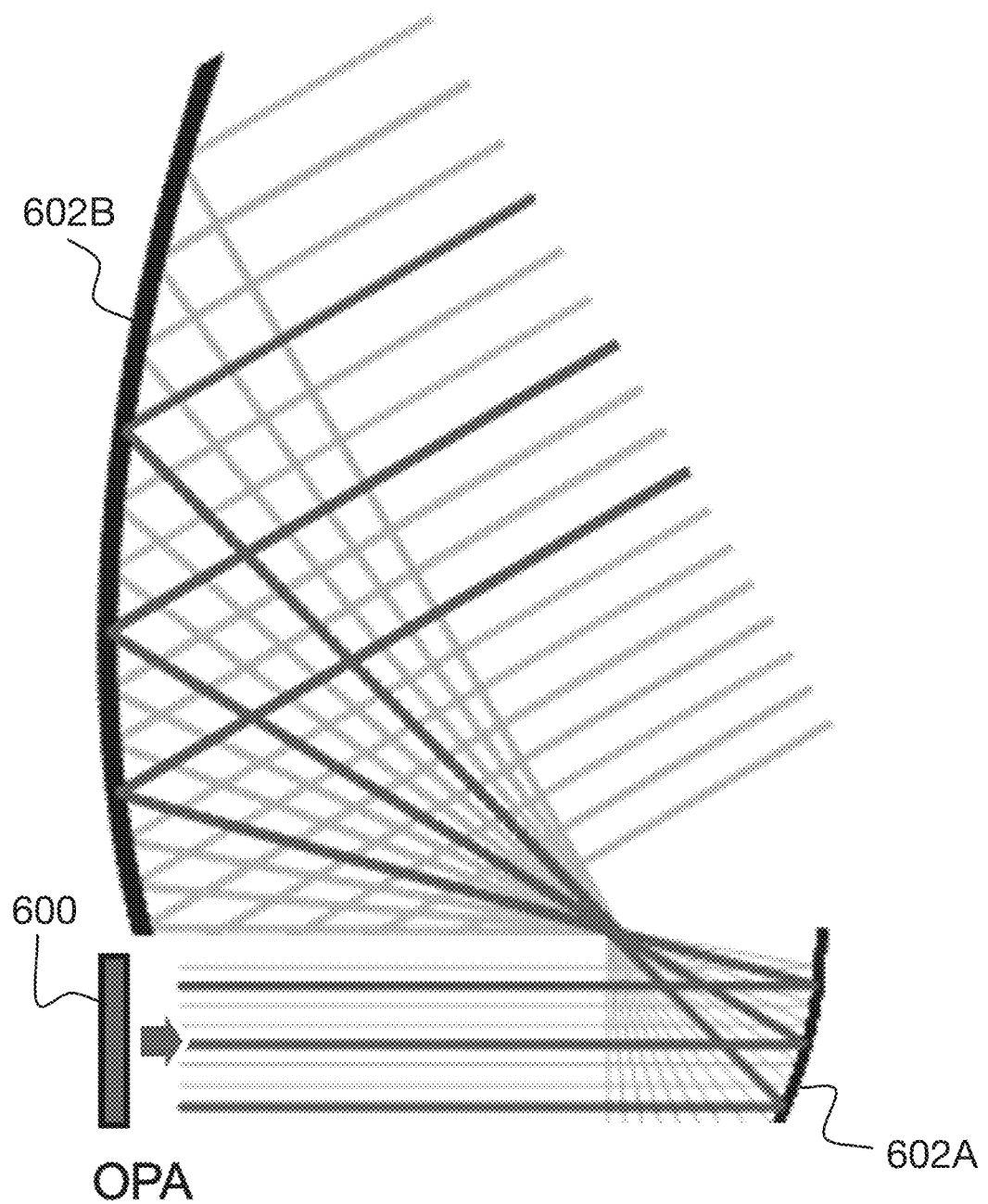

Optical beams can be expanded using a beam expander as shown in FIGS. 6A, 6B and 6C. In this example, an OPA 600 provides a substantially collimated beam to a beam expander that includes two off-axis parabola-shaped reflective optical components 602A and 602B. FIG. 6A shows two different off-axis angles and beam expansion ratios for two different beams (shown by the thicker lines). In the example of FIG. 6A, the OPA 600 has a surface emitting configuration where a collimated or limited divergence beam is formed by light that is gradually emitted over the lengths of an array of emitters that emit approximately perpendicular to the surface of the OPA 600. FIG. 6B shows an example in which an OPA 604 has an end-fire configuration where a collimated or limited divergence beam is formed by light that is emitted from the ends of an array of emitters that emit from an edge of the OPA 604. FIG. 6C shows a different off-axis angle that can be achieved by appropriate tilting of the optical components 602A and 602B. The OPA is positioned so that the relatively well collimated output beam of the OPA is directed into the first optical component 602A of the beam expander. The optical components 602A and 602B of the beam expander can be implemented using focusing elements such as mirrors and/or lenses that are positioned in such a way as to expand the beam by a factor of m. A reflective, refractive, or a combination of reflective/refractive beam expander could be used.

A reflective beam expander, where each of two focusing elements is implemented using a reflective surface (e.g., a curved mirror), has the advantage that it has no glass through which the beam propagates, and thus no chromatic aberrations, no element thickness or glass-specific tolerances, and no coupling between x- and y-axis when steering the beam. Alternatively, in a refractive beam expander, each of two focusing elements can be implemented using a refractive element such as a lens or a compound multi-element lens system. Or, a beam expander can use one reflective focusing element and one refractive focusing element in a telescopic arrangement. In any of the arrangements, the first and second focusing elements can have different effective focal lengths to provide a corresponding amount of magnification when expanding the beam from a relatively small transverse size to or from the OPA to a relatively large transverse size of a beam that is still substantially collimated for propagation over a relatively long distance to or from the OPA.

A sketch of a Gregorian telescope-based beam expander out of the phased array is shown in FIGS. 6A, 6B and 6C. The telescope consists of the two optical components 602A and 602B (here—off-axis parabolic mirrors) separated approximately by the sum of their individual focal lengths, also called an afocal beam expansion configuration. Off axis parabolas can be designed to have different off-axis angles. The OPA 600 is oriented so that phase-shifter-based steering steers the beam along the X-axis. In this example, for this steering to be maintained through the beam expander, the two mirrors need to have no optical power along the X-dimension, making each mirror an anamorphic asphere with optical power along one of the two dimensions. In this example, each mirror has a positive focal length in one dimension, and infinite focal length (flat surface) in the other dimension. Mirror surface figures could be further optimized from off-axis parabolas to generalized aspheres or some other shape that reduces optical aberrations and preserves a good wavefront quality at the output of the beam expander, while also preserving the wavefront quality due to the phase-shifter-based beam steering. A third optic could be inserted into the system in order to correct for aberrations and reduce the fabrication requirements on the two mirrors.

Other implementations of such a beam expander include having the first mirror having a negative focal length in the Y-dimension, and the second mirror having a positive focal length in the Y-dimension, similarly to the classical Cassegrain beam expander. In this example, the mirrors can be anamorphic, with curvature/optical power only in the Y-dimension. For this case, while spherical curvature along the Y-dimension will work, the beam will not be perfectly collimated and will have wavefront errors, due to optical aberrations present. Having both mirrors be paraboloids (one concave, with negative focal length, one convex, with positive focal length) would help to get rid of the aberrations and to collimate the beam. Other aspheric surfaces could also be used. A third optic could be inserted in the system in order to correct for aberrations and relax the requirements on one or both mirrors. This configuration allows saving on the size of the overall beam expander, since the two mirrors still need to be positioned approximately two focal lengths apart, but in the case one focal length is negative, allowing reduction of the size of the system.

Such a beam expander, with focusing power in one dimension only, expands the beam by a chosen beam expansion factor. For example, in case of two anamorphic off-axis parabolas used to expand the beam and oriented both at 90 degrees to each other, in order to expand the beam by a factor of 5, if the (apparent) focal length of mirror 1 along optical power dimension could be 10 mm, then the (apparent) focal length of mirror 2 along the optical power dimension should be 10×5=50 mm. We note here that "apparent" focal length of the off-axis parabola is a quantity that is defined from "parental" focal length and the off-axis angle as $$f_s = \frac{2f_p}{1+\cos\theta},$$

where $f_p$ is parental focal length equal to R/2, where R is the radius of curvature, and $\theta$ is the off-axis angle. The two mirrors in this case need to be positioned ~($f_{s1}+f_{s2}$) apart, also called an afocal beam expansion configuration, as shown in FIG. 6A, where $f_{s1}$ and $f_{s2}$ are apparent focal lengths of the two off-axis parabolas. If other optical components are inserted into the system, the distance between all optical components can be adjusted to make sure the input beam and output beam are both collimated to satisfy the afocal beam expansion configuration.

Figure 7A:
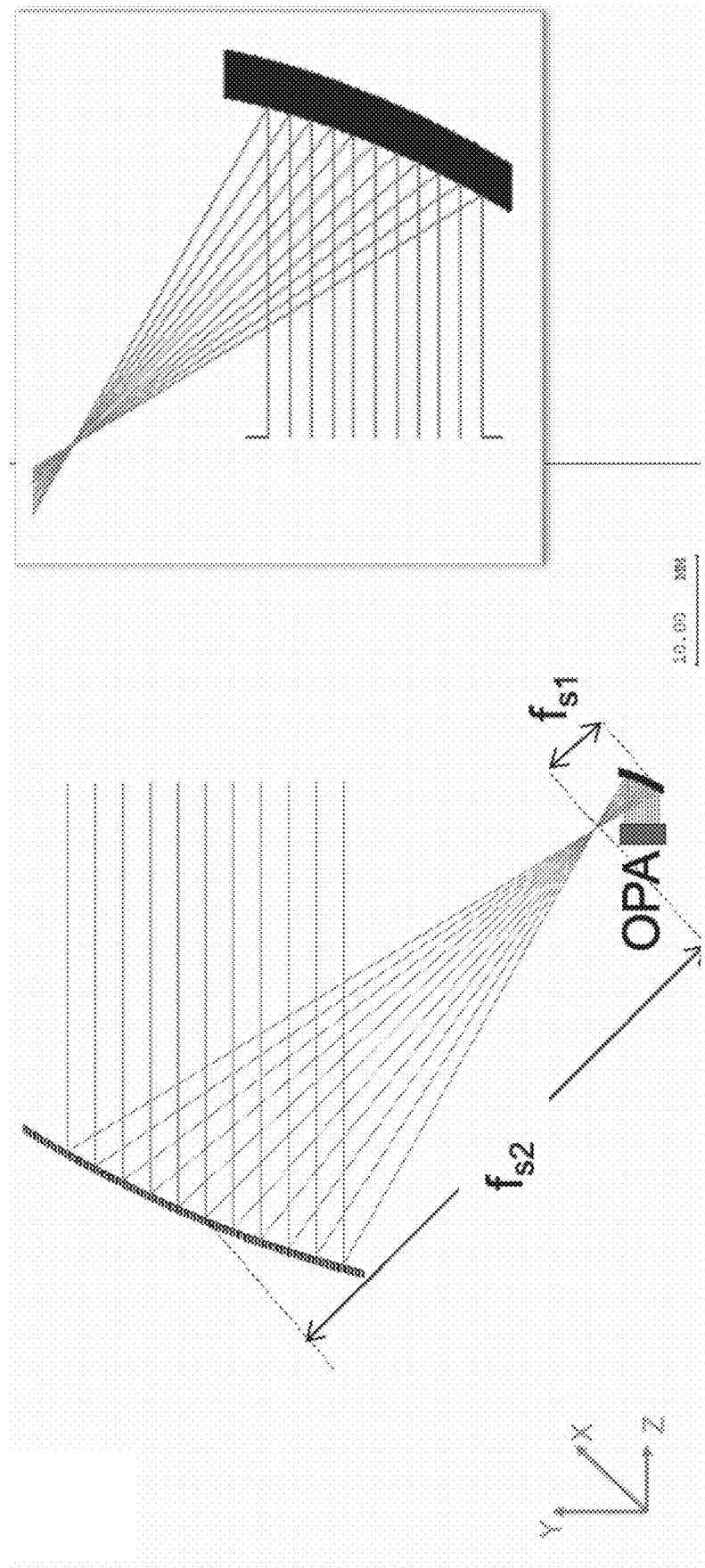
FIGS. 7A and 7B are schematic diagrams of example beam expansion configurations.
Figure 7B:
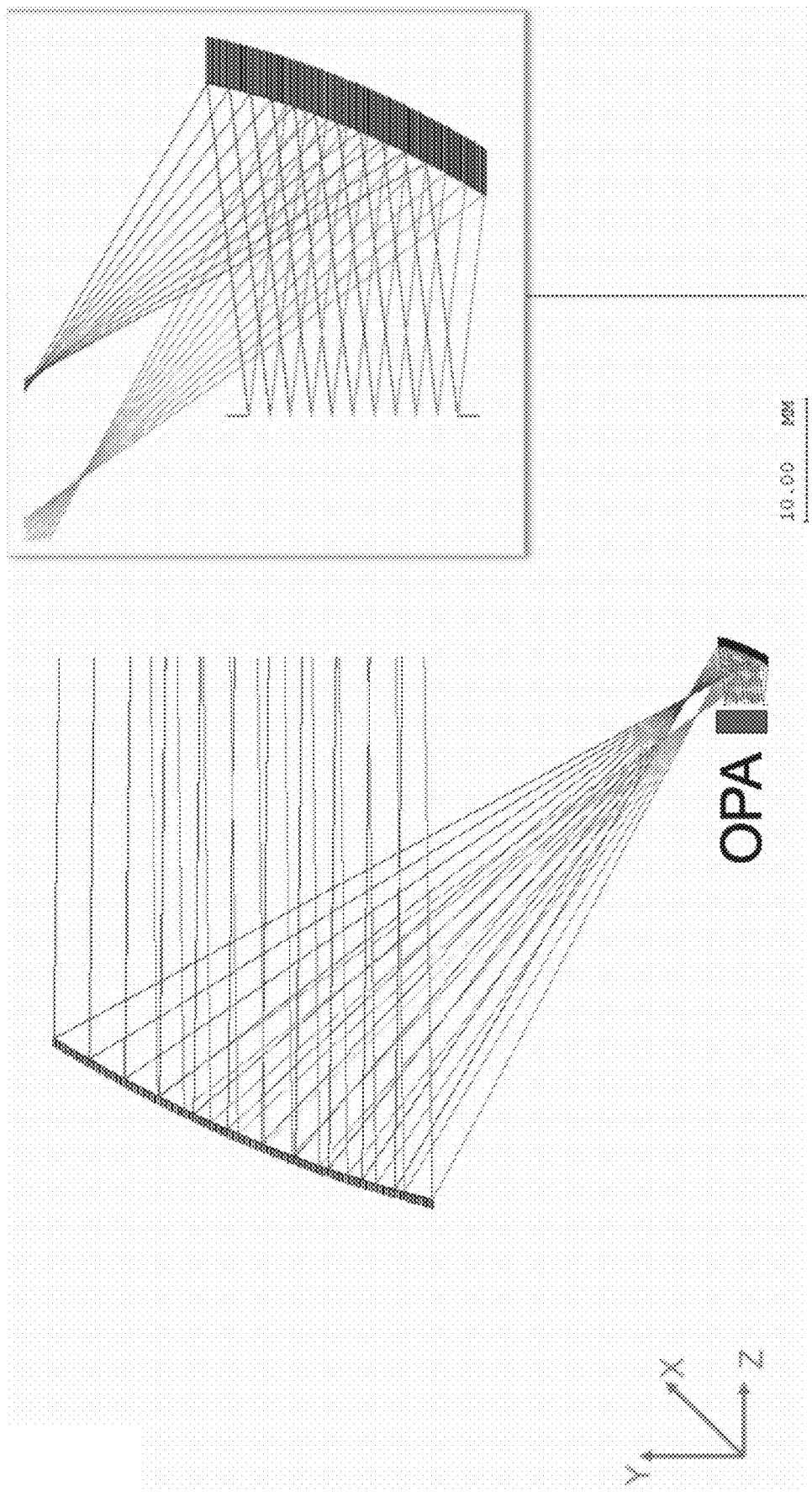

Generally, if the beam is expanded by the factor of X, the angular extent of the beam is reduced by a factor of X. This is useful because the OPAs with wavelength-based steering will emit light at different angles along the Y-dimension. FIGS. 7A and 7B show a simulation where the optical beam has been expanded from 3 mm to 25 mm, with a magnification factor of 25/3=8.3. In this example, FIG. 7A shows a two mirror-based beam expander with 0° incidence beam, and FIG. 7B shows a two mirror-based beam expander with ±7° incidence beam. $f_{s1}$ and $f_{s2}$ are apparent focal lengths of the two parabolic mirrors, with optical power along the y-axis only. The two off-axis parabolas both have 30° off-axis angle and positive focal lengths in the Y-dimension. FIG. 7A shows an optical beam coming out of an OPA at zero degrees steering angle. The output beam exits the beam expander at zero degrees with respect to the Z-axis. FIG. 7B shows two optical beams, with OPA steering angles of ±7° degrees. For an OPA grating emitters, grating dispersion leads to different wavelengths emitting at different angles. Here, ±7° represent the angles coming out of the OPA due to wavelength-based antenna dispersion. The beam expander has the angular acceptance of plus/minus a few degrees, which means the output beams will exit the beam expander with very little wavefront error if they are tilted with respect to the first mirror by just a few degrees. However, the output beam angle values would be reduced from their beam expander input values by a factor of m, where m is the beam expansion ratio.

Angular acceptance of a few degrees is a property of a beam expander that makes it useful for OPA-based beam steering, since it reduces the alignment sensitivity of the OPA when it is positioned in front of a beam expander. These few degrees of angular acceptance make OPA alignment easy—this is a potential advantage of the beam expander approach over other external optic approaches to expand the beam. 1° error in OPA alignment will result in negligible wavefront error, and the output beam exit angle change of (1/m)°, where m is the beam expansion ratio.

The techniques described herein can be used for LiDAR sensor systems. For example, referring to FIG. 8, two OPA systems with expanding focusing elements can be placed side by side, both steering using OPA phase control. In this example, a Tx Phased Array system 800A operates as the transmitter of the optical energy in an outgoing beam and an Rx Phased Array system 800B collects the backscattered light in a collected beam. Utilizing FMCW or time of flight detection schemes, for example, the distance to an object and its velocity can be measured (with Doppler shift detection). Note that the same expanding focusing elements can be used simultaneously for both of the Tx and Rx Phased Array systems.

Figure 9:
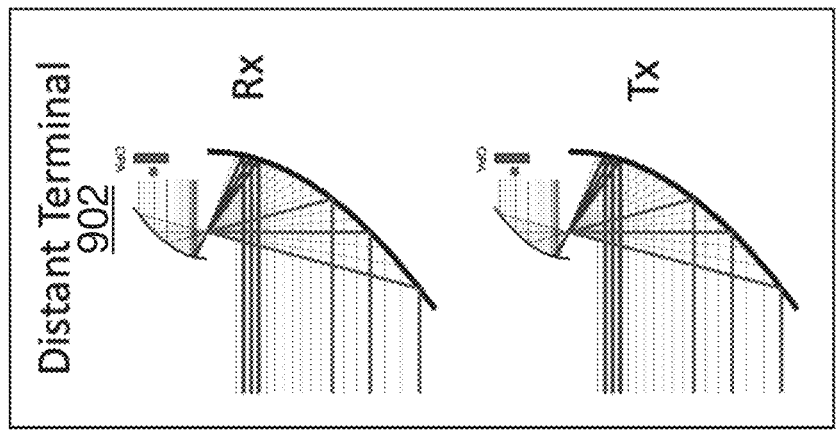
FIG. 9 is a schematic diagram of an example free space optical communication system.
Figure 9:
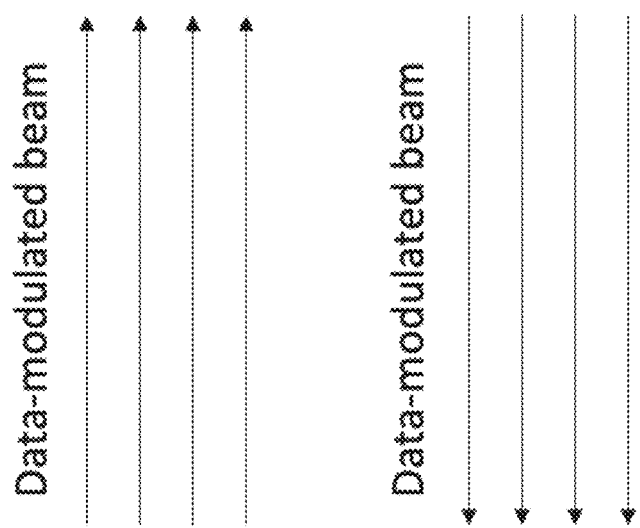
Figure 9:
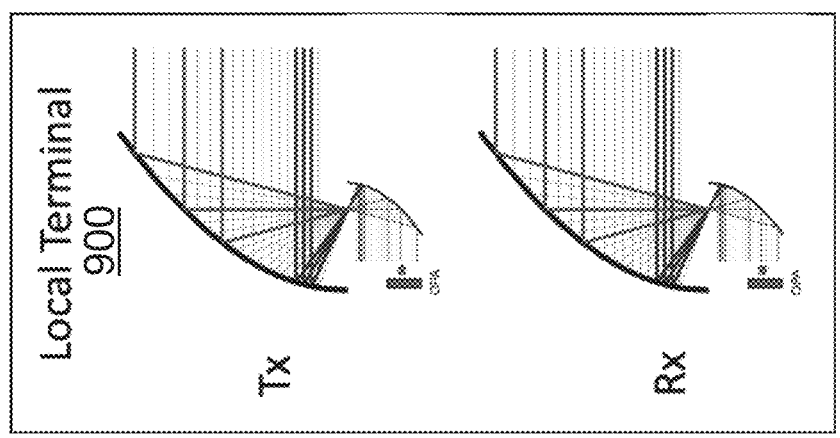

FIG. 9 shows an example of two OPA-based Tx/Rx transceiver systems using expanding focusing elements, including a local terminal 900 and distant terminal 902 at each end of an optical link, which can be used to implement a WDM high data rate communication system with free space optical beams. Again, the same expanding focusing elements can be used simultaneously for both the Tx and the Rx OPA systems in each terminal.

Figure 10A:
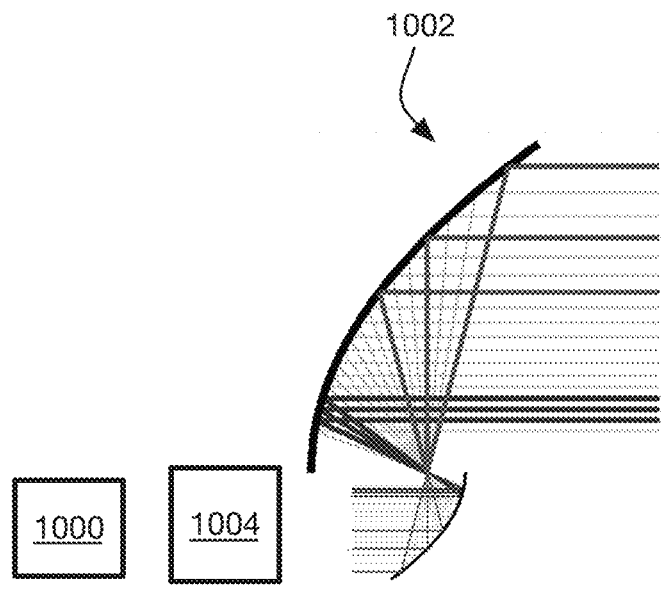
FIGS. 10A and 10B are schematic diagrams of example arrangements with beam expanders and dispersive elements.
Figure 10B:
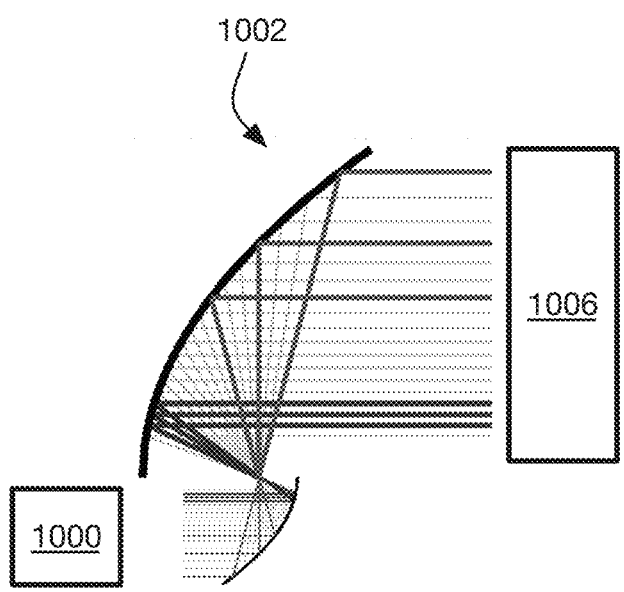

As described above, a variety of steering mechanisms can be used with the systems described herein. The emission angle of the outgoing beam, and (the same) receiving angle of the incoming beam, can be steered in one plane with phase control (i.e., controlling the relative phase shifts applied by phase shifters coupled to respective emitters). The the steering in another (e.g., orthogonal) plane can be performed by a steering element that is implemented using a dispersive element such as a diffractive element (which may include, for example, one or more diffraction gratings, one or more prisms, or a combination of diffraction grating(s) and prism(s)) that steers the beam when the incident wavelength is changed (e.g., via laser tuning). FIG. 10A shows an example arrangement that includes an OPA 1000 and a beam expander 1002. In this example, a dispersive element 1004 is placed between the OPA 1000 and the beam expander 1002. FIG. 10B shows another example in which a dispersive element 1006 is placed after the beam expander 1002. Other arrangements are also possible, including the distribution of multiple dispersive elements at different locations. The size of the dispersive element that is used may depend on the placement of that dispersive element.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus comprising:
an optical phased array disposed on a photonic integrated circuit, wherein the optical phased array comprises an array of emitters, and phase shifters configured to impose respective phase shifts on light to be emitted from different emitters in the array of emitters, and wherein the emitters are configured to limit divergence of a beam formed by interference among light emitted from the emitters such that the beam is substantially collimated over at least some distance,
a first focusing element at a fixed position relative to the optical phased array and configured to couple an optical beam to or from the optical phased array, and
a second focusing element at a fixed position relative to the first focusing element and configured to couple the optical beam to or from the first focusing element;
wherein at least one of the first or second focusing element is externally coupled to the photonic integrated circuit, and the first and second focusing elements have different effective focal lengths.

2. The apparatus of claim 1, wherein the first focusing element comprises a refractive element.

3. The apparatus of claim 2, wherein the refractive element comprises one or more lenses.

4. The apparatus of claim 1, wherein the first focusing element comprises a reflective surface.

5. The apparatus of claim 4, wherein the second focusing element comprises a reflective surface.

6. The apparatus of claim 5, wherein each of the first and second focusing elements comprises a parabolic mirror configured to reflect an optical beam off-axis from an axis of the parabolic mirror.

7. The apparatus of claim 5, wherein the first focusing element has a positive focal length in at least a first dimension and the second focusing element has a negative focal length in at least the first dimension.

8. The apparatus of claim 4, wherein the second focusing element comprises a refractive element.

9. The apparatus of claim 1, wherein the fixed position of the second focusing element relative to the first focusing element is configured to provide an afocal beam expansion configuration.

10. The apparatus of claim 1, wherein the photonic integrated circuit and the first and second focusing elements are included in at least a portion of a LiDAR system.

11. The apparatus of claim 1, wherein the photonic integrated circuit and the first and second focusing elements are included in at least a portion of a free space optical link of a communication system.

12. The apparatus of claim 1, wherein the phase shifters comprise waveguide-based phase shifters that are coupled to respective waveguides in the photonic integrated circuit.

13. A method for optically coupling to an optical phased array disposed on a photonic integrated circuit, the method comprising:
coupling an optical beam to or from the optical phased array, wherein the optical phased array comprises an array of emitters, and phase shifters configured to impose respective phase shifts on light to be emitted from different emitters in the array of emitters, and wherein the emitters are configured to limit divergence of a beam formed by interference among light emitted from the emitters such that the beam is substantially collimated over at least some distance,
coupling the optical beam between the optical phased array and a first focusing element at a fixed position relative to the optical phased array, and
coupling the optical beam between the first focusing element and a second focusing element at a fixed position relative to the first focusing element;
wherein at least one of the first or second focusing element is externally coupled to the photonic integrated circuit, and the first and second focusing elements have different effective focal lengths.

14. The method of claim 13, wherein the first focusing element comprises a refractive element.

15. The method of claim 13, wherein the first focusing element comprises a reflective surface.

16. The method of claim 15, wherein the second focusing element comprises a reflective surface.

17. The method of claim 16, wherein the first focusing element has a positive focal length in at least a first dimension and the second focusing element has a negative focal length in at least the first dimension.

18. The method of claim 15, wherein the second focusing element comprises a refractive element.

19. The method of claim 13, wherein the fixed position of the second focusing element relative to the first focusing element is configured to provide an afocal beam expansion configuration.

20. The method of claim 13, wherein the photonic integrated circuit and the first and second focusing elements are included in at least a portion of a LiDAR system.

21. The method of claim 13, wherein the photonic integrated circuit and the first and second focusing elements are included in at least a portion of a free space optical link of a communication system.

22. The method of claim 13, wherein the optical phased array comprises: an array of emitters, and phase shifters configured to impose respective phase shifts on light to be emitted from different emitters in the array of emitters.

23. The method of claim 22, wherein the emitters are configured to limit divergence of a beam formed by interference among light emitted from the emitters such that the beam is substantially collimated over at least some distance.

24. The method of claim 22, wherein the phase shifters comprise waveguide-based phase shifters that are coupled to respective waveguides in the photonic integrated circuit.

* * * * *